United States Patent
Larson

(10) Patent No.: US 6,858,665 B2
(45) Date of Patent: Feb. 22, 2005

(54) PREPARATION OF ELASTOMER WITH EXFOLIATED CLAY AND ARTICLE WITH COMPOSITION THEREOF

(75) Inventor: Brent Kevin Larson, Fairlawn, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 104 days.

(21) Appl. No.: 09/897,315

(22) Filed: Jul. 2, 2001

(65) Prior Publication Data

US 2003/0032710 A1 Feb. 13, 2003

(51) Int. Cl.$^7$ ................................................. C08K 3/34
(52) U.S. Cl. ....................... 524/445; 524/492; 524/493; 524/495; 524/496; 524/186
(58) Field of Search ................................. 524/445, 447, 524/186, 493, 495, 496

(56) References Cited

U.S. PATENT DOCUMENTS

| | | | | |
|---|---|---|---|---|
| 4,431,755 A | * | 2/1984 | Weber et al. ................ | 523/203 |
| 4,739,007 A | | 4/1988 | Okada et al. ................ | 524/789 |
| 4,810,734 A | | 3/1989 | Kawasumi et al. .......... | 523/216 |
| 5,385,776 A | | 1/1995 | Maxfield et al. ............. | 428/297 |
| 5,578,672 A | | 11/1996 | Beall et al. ................... | 524/446 |
| 5,840,796 A | | 11/1998 | Badesha et al. .............. | 524/449 |
| 5,936,023 A | * | 8/1999 | Kato et al. ................... | 524/445 |
| 6,034,164 A | * | 3/2000 | Elspass et al. ............... | 524/445 |
| 6,060,549 A | * | 5/2000 | Li et al. ....................... | 524/445 |
| 6,525,118 B2 | * | 2/2003 | Hergenrother et al. ...... | 524/111 |

| | | | | |
|---|---|---|---|---|
| 2002/0095008 A1 | * | 7/2002 | Heinrich et al. ............. | 524/442 |
| 2003/0004250 A1 | * | 1/2003 | Ajbani et al. ................ | 524/445 |

FOREIGN PATENT DOCUMENTS

| | | | | |
|---|---|---|---|---|
| EP | 1193085 | | 4/2002 | ........... B60C/13/00 |
| EP | 1211283 | | 6/2002 | ............ C08K/9/04 |
| GB | 2370280 | | 6/2002 | ............ C08L/9/06 |

* cited by examiner

Primary Examiner—Katarzyna Wyrozebski
(74) Attorney, Agent, or Firm—Henry C. Young, Jr.

(57) ABSTRACT

This invention relates to a rubber composition which contains intercalated and at least partially exfoliated organophillic clay reinforcement formed in situ within the elastomer host from a hydrophilic clay. The invention particularly relates to an in situ modification of a hydrophilic clay to compatibilize the clay with a diene-based elastomer. The clay is converted from being hydrophilic in nature to being more hydrophobic in nature and therefore more compatible with the elastomer by bulk blending the elastomer host with a smectite clay, preferably a montmorillonite or hectorite clay, and a hydrocarbyl onium salt, such as for example a quaternary ammonium salt, and particularly in the absence of water addition to the elastomer host. Therefore, such in situ procedure of intercalation and at least partially exfoliation relies upon a bulk blending thereof with an elastomer host at an elevated temperature and under high shear conditions in contrast to pre-intercalating the clay in an aqueous based medium and in contrast to simple low viscosity melt processing of a thermoplastic polymer. The invention also relates to articles of manufacture, including tires, having at least one component comprised of such rubber composition. Such tire component may be, for example, a tire tread.

7 Claims, No Drawings

PREPARATION OF ELASTOMER WITH EXFOLIATED CLAY AND ARTICLE WITH COMPOSITION THEREOF

FIELD OF THE INVENTION

This invention relates to a rubber composition which contains intercalated and at least partially exfoliated organophillic clay reinforcement formed in situ within the elastomer host from a hydrophilic clay. The invention particularly relates to an in situ modification of a hydrophilic clay to compatibilize the clay with a diene-based elastomer. The clay is converted from being hydrophilic in nature to being more hydrophobic in nature and therefore more compatible with the elastomer by bulk blending the elastomer host with a smectite clay, preferably a montmorillonite or hectorite clay, and a hydrocarbyl onium salt, such as for example a quaternary ammonium salt, and particularly in the absence of water addition to the elastomer host. Therefore, such in situ procedure of intercalation and at least partially exfoliation relies upon a bulk blending thereof with an elastomer host at an elevated temperature and under high shear conditions in contrast to pre-intercalating the clay in an aqueous based medium and in contrast to simple low viscosity melt processing of a thermoplastic polymer. The invention also relates to articles of manufacture, including tires, having at least one component comprised of such rubber composition. Such tire component may be, for example, a tire tread.

BACKGROUND OF THE INVENTION

Various natural occurring clays may be blended with various elastomers which usually act as relatively inactive fillers in rubber compositions insofar as reinforcement of the rubber compositions is concerned. Representative of such clays are, in general, for example, bentonite and kaolin clays. Such clays are conventionally hydrophilic in nature and therefore are relatively incompatible with diene-based elastomers.

However, some clays, such as, for example, smectite clays, and particularly montmorillonite clays which might be considered to be in a nature of a species of a bentonite clay, can be changed from being hydrophilic in nature to a clay being hydrophobic in nature and therefore more compatible with diene-based elastomers.

From an historical perspective, some naturally occurring layered clay minerals such as, for example, montmorillonite clay, which are hydrophilic in nature, are composed of a plurality of platelets which have a tendency to swell in the presence of water as a result of an associated increase of the distance between the platelets.

Such clay, particularly a montmorillonite clay, may be intercalated by chemical ion exchange methods. For such intercalation of a montmorillonite clay, the clay may be immersed in water to cause the clay to swell and a quaternary ammonium salt introduced, or included, in the water to cause the typically occurring sodium ions in the space between the platelets to be exchanged with the quaternary ammonium ion from the quaternary ammonium salt to further expand the distance between the platelets and to thereby intercalate the clay. If an alkyl quaternary ammonium salt is used which can impart aliphatic hydrocarbon chains on the surface of the clay by the ion exchange process, the intercalated clay can become more hydrophobic in nature and therefore more compatible with elastomers, particularly with diene-based elastomers.

The intercalated clay may then be dried and blended with an elastomer(s) under conditions of elevated temperature and relatively high shear conditions to cause the swelled and intercalated clay to at least partially exfoliate, or separate into small, individual platelets within the rubber composition and to contribute to the reinforcement of the rubber composition itself. Such intercalation procedure for montmorillonite clay and use thereof for reinforcement of rubber compositions is well known to those having skill in such art.

For example, an intercalated clay might be historically prepared by obtaining a smectite clay, other than a kaolin type clay, namely a clay such as, for example, a montmorillonite clay, which is comprised of a plurality of stacked layers, or platelets and which is swellable upon dispersion in water; dispersing the clay in an aqueous solution of a surfactant (e.g. a quaternary ammonium salt) which causes the clay to swell so that the average spacing between the platelets typically expands from about 4 Angstroms to an average spacing in a range of about 10 to about 30 Angstroms; followed by drying the treated, or intercalated, clay.

The smectite clay (e.g. montmorillonite clay) for use in this invention contains sodium ions between its layered platelets and the larger surfactant molecules contained in the water solution in which the clay is immersed position themselves between the layered platelets by an ion exchange with the sodium ions to cause or otherwise enhance the separation of the platelets to make the platelets more amenable to subsequent exfoliation.

Hydrophilic clays typically have a relatively high concentration of oxygen on their exposed surfaces and are therefore relatively incompatible with diene-based elastomers.

It is therefore often desirable to create intercalated clays which are more hydrophobic in nature by forming a predominance of aliphatic hydrocarbon chains on its exposed surfaces, thereby causing the intercalated clay to be more hydrophobic in nature. Such converted intercalated clays having aliphatic hydrocarbon chains on their surface are sometimes referred to as organoclays or might be sometimes as organophillic clays.

As hereinbefore related, the formation of aliphatic hydrocarbon chains on the surfaces of intercalated clay, and associated exfoliated platelets thereof may be accomplished, for example, by utilization of alkyl quaternary ammonium salts for treatment of the clay in its aqueous dispersion to create organoclays which are hydrophobic in nature which are more compatible with diene-based elastomers and therefore more readily dispersible in such elastomeric compositions.

Such conversion of naturally occurring hydrophilic clays such as montmorillonite clay to more hydrophobic organoclays for a more suitable dispersion in various elastomers is well known to those having skill in such art.

However, such operational steps to create more useful organoclays of a hydrophobic nature, including associated intercalated clays and exfoliated clay platelets for reinforcement of rubber composition, are process intensive. This is because of the aforesaid considerable and involved sequential steps of, for example, first immersing the hydrophilic clay in water which contains, for example, a suitable quaternary ammonium salt to cause it to swell and intercalate with an associated conversion of the clay to a hydrophobic organoclay, drying the organoclay, followed by dispersing the intercalated organoclay within an elastomer under high sheer mixing conditions to cause the intercalated organoclay to at least partially exfoliate into a plurality of individual platelets.

Accordingly, it is desired to enhance a creation of an intercalated and exfoliated montmorillonite clay which is hydrophobic in nature for use in the reinforcement of rubber compositions.

Historically, blending of an organoclay with a thermoplastic or thermosetting polymer by a melt blending process is discussed in U.S. Pat. Nos. 4,739,007; 4,810,734; 5,385,776; 5,578,672 and 5,840,796. Historically, blending of an adduct of a mineral filler such as for example a montmorillonite clay, and a quaternary ammonium salt with at least one rubber and an organosilane is discussed in U.S. Pat. No. 4,431,755.

For the description of this invention, the term "elastomer exfoliated nanoclay composite" means, unless otherwise indicated herein, an elastomer composition which contains an intercalated clay, in which the intercalated clay is at least partially exfoliated in situ within the elastomer host, particularly a smectite clay as a sodium montmorillonite clay, in which the particles are primarily organoclay platelets, and fragments of such platelets, wherein the platelets are somewhat circular and possibly elliptical in shape having an average, somewhat irregular, length and width, in a range of, for example, about 100 to about 1000 nanometers.

The smectite clay, preferably the montmorillonite clay, for use in this invention, might be described, for example, as a naturally occurring clay of a structure which is composed of a plurality of stacked, thin and relatively flat, layers, where such individual layers may be of a structure viewed as being composed of very thin octahedral shaped alumina layer sandwiched between two very thin tetrahedrally shaped silica layers to form an aluminosilicate structure. Generally, for such aluminosilicate structure in the naturally occurring montmorillonite clay, some of the aluminum cations ($Al^{+3}$) are viewed as having been replaced by magnesium cations ($Mg^{+2}$) which results in a net negative charge to the platelet layers of the clay structure. Such negative charge is viewed as being balanced in the naturally occurring clay with hydrated sodium, lithium, magnesium, calcium and/or potassium cations within the spacing (sometimes referred to as "galleries") between the aforesaid aluminosilicate layers, or platelets. The average spacing, between the layers, or platelets, typically in a range of about 1 to about 5 Angstroms, is largely determined by the nature of such aforesaid cation residues contained with the spacing and by the degree of hydration and which may be measured by x-ray diffraction method.

In the description of this invention, the term "phr" is used to designate parts by weight of a material per 100 parts by weight of elastomer. The terms "rubber" and "elastomer" may be used interchangeably unless otherwise indicated. The terms "vulcanized" and "cured" may be used interchangeably, as well as "unvulcanized" or "uncured", unless otherwise indicated.

SUMMARY AND PRACTICE OF THE INVENTION

In accordance with this invention, a process of preparing a rubber composition which contains a dispersion of intercalated and at least partially exfoliated clay comprises blending, based upon parts by weight per 100 parts by weight rubber (phr):

A. 100 phr of at least one hydrocarbon diene-based elastomer,

B. about one to about 20, alternately about one to about 6, phr of smectite clay, preferably montmorillonite and/or hectorite clay, C. a hydrocarbyl onium salt, and D. about 20 to about 99 phr of at least one additional reinforcing filler comprised of carbon black, synthetic amorphous silica or silica treated carbon black and mixtures thereof, wherein said hydrocarbyl onium salt is of the general formula (I) represented in an ionized form comprised of a cation and an anion ($A^-$):

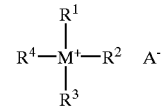

(I)

wherein $R^1$ is hydrogen or an alkyl group containing from one to three carbon atoms, such as, for example, methyl, ethyl, isopropyl and n-propyl groups; $R^2$, $R^3$ and $R^4$ are individually selected from alkyl groups having from one to 40, alternately from one to 18 carbon atoms and allyl and aryl groups having from 6 to 40, alternately from 6 to 18, carbon atoms; and wherein $A^-$ is an anion selected from one of chloride, bromide, iodide, fluoride, cyanide, nitrate, hydroxide, thiocyanate, perchlorate, chlorate, bromate, permanganate, formate, acetate, propionate, benzoate, m-toluate, p-toluate, salicylate, methane sulfonate, bisulfate, bicarbonate, dihydrogen phosphate, phenoxide, picrate, methoxide, alkoxide and like anions having a single negative charge, preferably $Cl^-$; and wherein M is selected from nitrogen, sulfur or phosphorous, preferably nitrogen.

Representative of such alkyl groups for the $R^2$, $R^3$ and $R^4$ group(s) are, for example straight chain groups such as, for example, methyl, octyl, decyl and octadecyl, groups, and branched chain groups such as, for example, an ethylhexyl group, as well as tallow (usually about 18 carbon atoms) and hydrogenated tallow.

Thus the hydrocarbyl onium salt may be, for example, an alkyl quaternary ammonium salt where such alkyl quaternary ammonium ion is a cation and chlorine is an anion.

In practice, said hydrocarbyl onium salt is therefore typically a quaternary ammonium salt and typically used in an amount in a range of about 0.5 to about 2 moles of ammonium moiety of said salt per mole of sodium ion of said clay.

Representative examples of hydrocarbyl onium salts are exemplified in U.S. Pat. No. 2,531,396, which in incorporated herein by reference in its entirety, and which exemplifies various amine based salts, ammonium compounds such as quaternary ammonium salts, pyridinium compounds and phosphonium compounds.

Further representative examples are methyl trialkyl ammonium chloride, trimethyl alkyl ammonium chloride, dimethyl dialkyl ammonium chloride, dimethyl alkyl allyl ammonium chloride and dimethyl diallyl ammonium chloride.

In practice, for example, a methyl trialkyl quaternary ammonium salt, such as, for example, methyl trioctyl quaternary ammonium salt is seen herein to undergo an ionic exchange with sodium ions contained on the surface of said montmorillonite clay, all in situ within the elastomer host and in the absence of a pre-swelling of the clay in an aqueous dispersion thereof, to replace at least a major portion of said sodium ions with the alkyl quaternary ammonium salt to thereby cause the montmorillonite clay to become more hydrophobic nature and thus more compatible with the elastomer host.

While particulate carbon black and amorphous silica, and sometimes clay, have heretofore been used for reinforcing rubber compositions for various tire components, a tire with certain component(s) comprised of a rubber composition which contains an intercalated organoclay which is both intercalated and exfoliated in situ by bulk blending within the elastomer host at elevated temperature and under high shear conditions is considered herein to be novel and a significant departure from past practice.

In further accordance with this invention, said rubber composition is provided wherein said montmorillonite clay is intercalated and at least partially exfoliated and, also rendered more hydrophobic in nature, all in situ within said elastomer host, wherein said exfoliated platelets are relatively thin, two dimensional platelets homogeneously dispersed with the elastomer host.

In additional accordance with this invention, said rubber composition is provided wherein said intercalated and exfoliated montmorillonite clay is in a form of organophillic platelets having a thickness in a range of about one to about 20 nanometers (nm), a length in a range of about 50 to about 500 nm and an aspect ratio (length to thickness) in a range of from about 50/1 to about 500/1

A significant aspect of this invention is the generation of an organoclay in situ within the elastomer host during the processing of the elastomer(s) which is considered herein to be a more efficient way of both hydrophobating and dispersing the clay within the elastomer host, all in the absence of a pre-intercalation of the clay and exclusive of a pre-swelling of the clay in an aqueous dispersion thereof.

While the resultant invention appears to be relatively simplistic, such simplistic nature goes to the heart of the invention because it is considered herein that there is a sufficient complexity that the essence of the invention involving application of an ion exchange mechanism, normally required to include treatment of a clay by a pre-swelling of the clay in an aqueous dispersion, which can only be determined by an appropriate experimentation and trial, especially in view of the aforesaid prior practice of first both swelling and pre-treating the clay in an aqueous medium, recovering and drying the treated clay followed by mixing the recovered, treated clay with one or more elastomers to cause the treated clay to at least partially exfoliate within the elastomer.

In further accordance with this invention, a rubber composition is provided which has been prepared by such method.

In additional accordance with this invention, an article of manufacture is provided having at least one component comprised of the rubber composition of this invention.

In further accordance with this invention, a tire is provided having at least one component comprised of the rubber composition of this invention.

In additional accordance with this invention, a tire having a tread comprised of the rubber composition of this invention is provided.

In practice, a coupling agent may also be used to aid in coupling said hydrophobic intercalated clay particles and exfoliated platelets thereof, as the case may be, to an associated diene-based elastomer host.

Preferably such coupling agent is mixed with the elastomer subsequent to the intercalation, and preferably after the at least partial exfoliation or at least after a major extent of the partial exfoliation of the clay (e.g. after at least 50 percent of said partial exfoliation) so that the coupling agent does not interfere with the clay's intercalation, and preferably does not unnecessarily interfere with said at least partial exfoliation, as well as transformation of the clay from its inherent hydrophilic nature to a more hydrophobic nature.

Such coupling agents typically have a moiety which is reactive with hydroxyl groups (which might be silanol groups) contained on the surface of the intercalated clay and exfoliated platelets, as the case may be, and another moiety interactive with at least one of said elastomers.

For example, although not intended to be limiting, such coupling agents may include, for example, bis(3-alkoxysilylalkyl) polysulfides, such as, for example, a bis (3-alkoxysilylpropyl) polysulfide having an average of from about 2 to about 2.6 or from 3.5 to about 4, connecting sulfur atoms in its polysulfidic bridge. Bis(3-ethoxysilylpropyl) polysulfides may be preferred.

For this invention, said exfoliated montmorillonite clay platelets are viewed herein as being in a form of thin, substantially two dimensionally shaped materials in a sense that their planar length and width dimensions are in a range of about 50 to about 2000 nanometers for said particles of stacked platelets and about 50 to about 500 nanometers for said exfoliated platelets, with the length being longer than the width, and with a thickness in a range of about 10 to about 40 nanometers for said particles of stacked platelets and about one nanometer for said exfoliated platelets.

In practice, for the purposes of this invention, the montmorillonite clay is homogeneously dispersed in and is intercalated and at least partially exfoliated as well as being rendered more hydrophobic in nature, all in situ within its elastomer host, by mixing said clay, in the absence of water, with said diene-based elastomer(s) at a temperature in a range of about 100° C. to about 175° C. and under conditions sufficient to intercalate, and at partially exfoliate, said clay in an internal mixer in combination with a quaternary ammonium salt of the general formula (I).

In practice, it is considered herein that the montmorillonite clay becomes more compatible with the diene-based elastomer host after its intercalation and exfoliation as well as its transition to a more hydrophobic form, all in situ within the elastomer host.

For such combination of intercalation and exfoliation of the clay, as well as its transformation to a more hydrophobic form, all within the elastomer host at the elevated temperature, it is preferred that about 30 to about 95, alternately about 30 to about 60 or alternately about 60 to about 95, weight percent of the intercalated clay becomes intercalated and, at least to some extent exfoliated, within the elastomer host during the mixing thereof.

In practice, various diene-based elastomers may be used for the tire component (e.g. tire tread) such as, for example, homopolymers and copolymers of monomers selected from isoprene and 1,3-butadiene and copolymers of at least one diene selected from isoprene and 1,3-butadiene and a vinyl aromatic compound selected from styrene and alphamethyl styrene, preferably styrene.

Representative of such conjugated diene-based elastomers are, for example, cis 1,4-polyisoprene (natural and synthetic), cis 1,4-polybutadiene, styrene/butadiene copolymers (aqueous emulsion polymerization prepared and organic solvent solution polymerization prepared), medium vinyl polybutadiene having a vinyl 1,2-content in a range of about 15 to about 90 percent, isoprene/butadiene copolymers, styrene/isoprene/butadiene terpolymers. Tin coupled elastomers may also be used, such as, for example, tin coupled organic solution polymerization prepared styrene/butadiene co-polymers, isoprene/butadiene copolymers, styrene/isoprene copolymers, polybutadiene and styrene/isoprene/butadiene terpolymers.

In the practice of this invention, where natural rubber is to be used, the grade of purity of cis 1,4-polyisoprene natural rubber is preferred to be of quality, or grade, of Rib Smoked Sheet Number 2 (R.S.S.#2) or better, according to *The Green Book* of the IRQPC (International Standards of Quality and Packing of Natural Rubber Grades).

In the further practice of this invention, particulate reinforcement for the rubber composition may also include particulate synthetic amorphous silica, particularly precipitated silica, or a combination of carbon black and amorphous silica (exclusive of silica treated carbon black), usually of an amount in a range of about 35 to about 100 alternately about 35 to about 90, phr. If a combination of such carbon black and silica is used, usually at least about 5 phr of carbon black and at least 10 phr of silica are used. For example, a weight ratio of silica to carbon black ranging from about 1/5 to 5/1 might be used.

Commonly employed synthetic amorphous silica, or siliceous pigments, used in rubber compounding applications can be used as the silica in this invention, including precipitated siliceous pigments and fumed (pyrogenic) silica wherein aggregates of precipitated silicas are usually preferred.

The precipitated silica aggregates preferably employed in this invention are precipitated silicas such as, for example, those obtained by the acidification of a soluble silicate, e.g., sodium silicate and may include coprecipitated silica and a minor amount of aluminum.

Such silicas might usually be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, Page 304 (1930).

The silica may also be typically characterized by having a dibutylphthalate (DBP) absorption value in a range of about 50 to about 400 cm3/100 g, and more usually about 100 to about 300 $cm^3/100$ g.

Various commercially available precipitated silicas may be considered for use in this invention such as, only for example herein, and without limitation, silicas from PPG Industries under the Hi-Sil trademark with designations Hi-Sil 210, Hi-Sil 243, etc; silicas from Rhodia as, for example, Zeosil 1165MP and Zeosil 165GR, silicas from Degussa AG with, for example, designations VN2 and VN3, as well as other grades of silica, particularly precipitated silicas, which can be used for elastomer reinforcement.

As hereinbefore discussed, various coupling agents may be used if desired. For example, a bis(3-trialkoxysilylalkyl) polysulfide having an average of 2 to 2.6 or of 3.5 to 4 connecting sulfur atoms in its polysulfide bridge may be used.

It is readily understood by those having skill in the art that the rubber composition would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, silicas, and plasticizers, fillers, pigments, fatty acid, zinc oxide, waxes, antioxidants and antiozonants, peptizing agents and reinforcing materials such as, for example, carbon black. As known to those skilled in the art, depending on the intended use of the sulfur vulcanizable and sulfur vulcanized material (rubbers), the additives mentioned above are selected and commonly used in conventional amounts.

Typical amounts of tackifier resins, if used, comprise about 0.5 to about 10 phr, usually about 1 to about 5 phr. Typical amounts of processing aids comprise about 1 to about 50 phr. Such processing aids can include, for example, aromatic, napthenic, and/or paraffinic processing oils. Typical amounts of antioxidants comprise about 1 to about 5 phr. Representative antioxidants may be, for example, diphenyl-p-phenylenediamine and others, such as, for example, those disclosed in *The Vanderbilt Rubber Handbook* (1978), Pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 1 to about 10 phr. Typical amounts of waxes comprise about 1 to about 5 phr. Often microcrystalline waxes are used. Typical amounts of peptizers comprise about 0.1 to about 1 phr.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 4 phr, or even, in some circumstances, up to about 8 phr.

Accelerators are used to control the time and/or temperature required for vulcanization and to improve the properties of the vulcanizate. In one embodiment, a single accelerator system may be used, i.e., primary accelerator. Conventionally and preferably, a primary accelerator(s) is used in total amounts ranging from about 0.5 to about 4, preferably about 0.8 to about 1.5, phr. In another embodiment, combinations of a primary and a secondary accelerator might be used with the secondary accelerator being used in smaller amounts (of about 0.05 to about 3 phr) in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The presence and relative amounts of the above additives are not considered to be an aspect of the present invention, unless otherwise indicated herein, which is more primarily directed to the utilization of a particulate reinforcement of a conjugated diene-based elastomer for a component of a tire (e.g. tire tread) prepared by in situ intercalation and partial exfoliation of the clay within the elastomer host.

The mixing of the rubber composition can be accomplished by methods known to those having skill in the rubber mixing art. For example, the ingredients are typically mixed in at least two stages, namely, at least one non-productive stage followed by a productive mix stage. The final curatives are typically mixed in the final stage which is conventionally called the "productive" mix stage in which the mixing typically occurs at a temperature, or ultimate temperature, lower than the mix temperature(s) than the preceding non-productive mix stage(s). The rubber, and fillers such as silica and silica treated carbon black and adhesive agent, are mixed in one or more non-productive mix stages. The terms "non-productive" and "productive" mix stages are well known to those having skill in the rubber mixing art.

The following examples are presented to illustrate the invention and are not intended to be limiting. The parts and percentages are by weight unless otherwise designated.

EXAMPLE I

A series of natural cis 1,4-polyisoprene rubber based compositions were prepared which are referred to herein as Samples A through F, with Samples A and B, as well as Sample F, being Control Samples.

Control Sample A is prepared without an addition of clay.

Control Sample B is prepared with an addition of non-intercalated montmorillonite clay.

Samples C, D and E are prepared in which 3.3, 6.6 and 3.3 phr, respectively, of an non-intercalated montmorillonite clay is added together with a methyl trialkyl quaternary ammonium salt so that the clay is both intercalated and partially exfoliated in situ with in the elastomer host.

Sample E is a duplicate of Sample C except that a reduced amount of carbon black reinforcement is used, namely 40 phr instead of 55 phr of carbon black.

Control Sample F is a duplicate of Control Sample A except that 5 phr of an organo clay, namely a pre-intercalated montmorillonite clay, was added to the rubber composition. No additional quaternary ammonium salt was added. The amount of 5 phr was used for the organo clay as a quantity similar to the sum of clay and quaternary ammonium salt (5 phr) used for Samples C and E. The organo clay for Control Sample F had been prepared by pre-intercalating montmorillonite clay with a quaternary ammonium salt prior to its addition to the rubber composition.

For this Example, in what is usually referred as a non-productive mixing procedure, samples are prepared by first adding the natural rubber to an internal rubber mixer which had been preheated to a temperature of about 100° C. and first mixing the rubber therein for about 30 seconds minutes to slightly break down the rubber and reduce its viscosity, following which the clay, where applicable, and other indicated ingredients, except for sulfur and associated sulfur vulcanization accelerators, are mixed with the elastomer for a total mixing time of about six minutes, to a temperature of about 160° C., after which the mixture is removed from the rubber mixer, open roll milled, sheeted out and cooled to a temperature below 40° C.

In what is usually referred to a subsequent mixing step, usually referred to as a productive mixing step, the mixture is introduced into an internal rubber mixer and sulfur and vulcanization accelerators are added and mixed for about three minutes to a temperature of about 100° C.

For this Example some degree of intercalation and at least partial exfoliation of the clay of Samples C, D and E occurs within the elastomer host, as well as a conversion of the hydrophilic nature of the clay to a more hydrophobic form due to the aforesaid ion exchange of alkyl group(s) of the said quaternary ammonium salt with sodium ions of the clay, so that a relatively homogeneous dispersion of the intercalated clay, delaminated clay platelets, and particles thereof, within the elastomer composition is obtained.

The compositions of Samples A through F are shown in the following Table 1.

TABLE 1

| Material | Parts | | | | | |
|---|---|---|---|---|---|---|
| | Control Sample A | Control Sample B | Sample C | Sample D | Sample E | Control Sample F |
| Non-Productive Mixing | | | | | | |
| Natural rubber[1] | 100 | 100 | 100 | 100 | 100 | 100 |
| Carbon black[2] | 55 | 55 | 55 | 55 | 40 | 55 |
| Processing oil[3] | 3 | 3 | 3 | 3 | 3 | 3 |
| Tackifying resin | 2 | 2 | 2 | 2 | 2 | 2 |
| Zinc oxide | 2 | 2 | 2 | 2 | 2 | 2 |
| Clay[4] | 0 | 3.3 | 3.3 | 6.6 | 3.3 | 0 |
| Quaternary ammonium salt[5] | 0 | 0 | 1.7 | 3.4 | 1.7 | 0 |
| Organo clay[6] | 0 | 0 | 0 | 0 | 0 | 5 |
| Productive Mixing Step | | | | | | |
| Accelerator(s)[7] | 1.6 | 1.6 | 1.6 | 1.6 | 1.6 | 1.6 |
| Sulfur | 5 | 5 | 5 | 5 | 5 | 5 |
| Prevulcanization inhibitor[8] | 0.3 | 0.3 | 0.3 | 0.3 | 0.3 | 0.3 |
| Zinc oxide | 3 | 3 | 3 | 3 | 3 | 3 |

[1]Cis 1,4-polyisoprene natural rubber of grade TSR-CV (Technical Specification Rubber, Constant Viscosity) which is understood to be of a grade equal to or better than R.S.S.#2 natural rubber
[2]N326, an ASTM designation
[3]Naphthenic type rubber processing oil
[4]Montmorillonite clay, not intercalated, having an average spacing between its layers, or platelets, of about 4 Angstroms and obtained as Clarite NA+ from the Southern Clay Products Company.
[5]Methyl trialkyl quaternary ammonium salt obtained as Adogen ® 464, a methyl trialkyl ammonium chloride, where said alkyl groups averaged from 8 to 10 carbon atoms, from the Aldrich Chemical Company
[6]organo clay as a pre-intercalated clay of a hydrophobic nature obtained as Cloisite ® 25A from Southern Clay Products
[7]Of the sulfonamide type
[8]Of the phthalimide type Various physical properties of the Samples of Table 1 were evaluated and reported in the following Table 2.

In the following Table 2 the terms "UTS" and "RPA" mean "Ultimate Tensile System" and "Rubber Processability Analyzer", respectively.

TABLE 2

| Properties | Control Sample A | Control Sample B | Sample C | Sample D | Sample E | Control Sample F |
|---|---|---|---|---|---|---|
| UTS Determined Modulus/Tensile/Elongation | | | | | | |
| 100% Modulus, MPa | 4.5 | 4.4 | 7.8 | 9.2 | 5.5 | 6.9 |
| 150% Modulus, MPa | 7.4 | 7 | 11.7 | 11.9 | 8.4 | 10.5 |
| 200% Modulus, MPa | 10.8 | 10.2 | 15.5 | —[3] | 11.8 | 14.3 |
| 300% Modulus, MPa | 17.9 | 16.8 | —[3] | —[3] | 18.67 | —[3] |
| Ult Tensile strength, MPa | 22.1 | 20.9 | 17.6 | 12.5 | 23.7 | 19.6 |
| Ult elongation (%) | 372 | 378 | 234 | 174 | 378 | 284 |
| RPA at 100° C., 11 Hertz | | | | | | |
| G' at 1% strain (kPa)[1] | 4086 | 3161 | 7752 | 8580 | 5052 | 5488 |

TABLE 2-continued

| Properties | Control Sample A | Control Sample B | Sample C | Sample D | Sample E | Control Sample F |
|---|---|---|---|---|---|---|
| G' at 10% strain (kPa)[1] | 2071 | 1778 | 3483 | 4168 | 2660 | 3013 |
| Tan Delta at 1% strain[2] | 0.11 | 0.11 | 0.09 | 0.08 | 0.06 | 0.07 |
| Tan Delta at 10% strain[2] | 0.15 | 0.15 | 0.15 | 0.15 | 0.12 | 0.11 |

[1]The G' value at one percent strain, or elongation, namely a measure of Storage Modulus, as is well known to those having skill in such art, is considered herein to be a measure of stiffness, wherein an increase of G' is a corresponding indication of an increase in stiffness of the rubber composition.
[2]The Tan Delta at one percent strain, or elongation, namely a ratio of Loss Modulus to Storage Modulus, as is well known to those having skill in such art, is considered herein to be a measure of hysteresis wherein a lower hysteresis is desirable for better tire rolling resistance (less resistance to rolling) and therefore better associated vehicular fuel economy. A decrease in the Tan Delta value is a corresponding indication of an decrease in hysteresis of the rubber composition.
[3]These values could not be determined because of early failure as can be seen by the corresponding ultimate elongation values.

It can be seen from Table 2 that Samples C, D and E, which contain the in situ formed organoclay, namely the intercalated and partially exfoliated montmorillonite clay formed in situ within the elastomer host without a pre-intercalation of the clay in a water based medium, have a significantly increased G', and therefore increased stiffness, without an increase in Tan Delta values, or hysteresis, as compared to both Control Sample A to which no clay was added and Control Sample B to which a non-intercalated montmorillonite clay was added.

This is considered herein to be significant and beneficial because a stiffer rubber (higher modulus value) is observed which is a rubber physical property often desired for various tire components, which was obtained without a significant sacrifice in Tan Delta values which is also a desirable effect for various tire components.

For Samples C, D and E, the 100 percent and 150 percent modulus values are appreciably increased, as well as the 200 percent moduli for Samples C and E, as compared to Control Samples A and B whereas ultimate tensile strength and ultimate elongation values are only somewhat decreased and for Sample E, the elongation is comparable. The gain in 100 and 150 percent modulus values is more important than loss in ultimate tensile strength.

This difference in relative gain and loss in such values is considered herein to be an interesting phenomenon which can have beneficial results for rubber compositions for use in various tire components. For example, this is considered herein to be significant because the indicated loss in ultimate tensile strength might be tolerated for various tire components, depending upon the tire component involved, when such large increase in 100 and 150 percent modulus strength is observed.

For Sample E, it is observed that replacing 15 phr of carbon black with an inclusion of 5 phr of in situ intercalated clay, a greater increase in stiffness (modulus) and ultimate tensile strength values were obtained, together with equal or reduced hysteresis (Tan Delta values) as compared to the values for Sample C which also contained the in situ intercalated clay but with an inclusion of carbon black comparable to Control Sample A.

For Control Sample F, with the addition of the pre-intercalated clay instead of the in situ intercalated clay for Samples C, D and E, it is seen that modulus value increased, as expected, as compared to Control Sample A.

However, interestingly, the modulus values for Sample F did not increase as much as the modulus value for Sample C in which the intercalation of the clay was caused to occur in situ within the elastomer host.

For Sample F, the indicated ultimate tensile strength value was greater than Control Sample A (without a clay addition) and less than the ultimate tensile strength of Sample C in which the clay was intercalated in situ within the elastomer host.

Both of these observed physical property observations indicate that a different rubber composition is obtained by causing the clay to intercalate and at least partially exfoliate in situ within the elastomer (Samples C, D and E) as compared to adding a pre-intercalated clay (Control Sample F) or adding the clay without any quaternary ammonium salt treatment (Control Sample B).

The aforesaid relative increase in modulus values for Sample C, D and E is considered herein to be significant because higher stiffness (higher modulus value) is usually desirable for various tire components while low hysteresis (e.g. lower Tan Delta value at one percent strain, or elongation) is indicative of lower rolling resistance (improved fuel economy) for a tire having a component (e.g. tread) of such rubber composition.

While various embodiments are disclosed herein for practicing the invention, it will be apparent to those skilled in this art that various changes and modifications may be made therein without departing from the spirit or scope of the invention.

What is claimed is:

1. A process of preparing a rubber composition which contains a dispersion of intercalated and at least partially exfoliated smectite clay, wherein said smectite clay is intercalated and exfoliated in situ within an elastomer host comprises blending, based upon parts by weight per 100 parts by weight rubber (phr):

A. 100 phr of at least one hydrocarbon diene-based elastomer,

B. about one to about 20 phr of said smectite clay selected from at least one of montmorillonite clay and hectorite clay and mixtures thereof, C. quaternary animonium salt selected from methyl trialkyl ammonium chloride, trimethyl alkyl ammonium chloride, dimethyl dialkyl animonium chloride, dimethyl alkyl allyl ammonium chloride and diniethyl diallyl ammonium chloride, and D. about 20 to about 99 phr of at least one additional reinforcing filler comprised of at least one of carbon black, synthetic amorphous silica or silica treated carbon black and mixtures thereof;

wherein a coupling agent is mixed therewith subsequent to said intercalation of said smectite clay and after at least a partial exfoliation of said intercalated clay to form exfoliated clay platelets;

wherein said coupling agent is a bis(3-triethoxysilylpropyl) polysulfide having an average of from about 2 to about 2.6 or an average of from about 3.5 to about 4 connecting sulfur atoms in its polysulfidic bridge.

2. The process of claim 1 wherein said coupling agent is a bis(3-trietboxysilylpropyl) polysulfide having an average of from about 2 to about 2.6 connecting sulfur atoms in its polysulfidic bridge.

3. The process of claim 1 wherein said quaternary ammonium salt is used in an amount of about 0.5 to about 2 moiety per mole of sodium ion of said clay.

4. A rubber composition prepared by the process of claim 1.

5. An article of manufacture having at least one component of a rubber composition comprised of the rubber composition of claim 4.

6. A tire having at least one component of a rubber composition comprised of the rubber composition of claim 4.

7. A tire having a tread of a rubber composition comprised of the rubber composition of claim 4.

\* \* \* \* \*